(No Model.)
A. W. ROBERTSON.
SURFACE CONDENSER.
No. 281,927. Patented July 24, 1883.
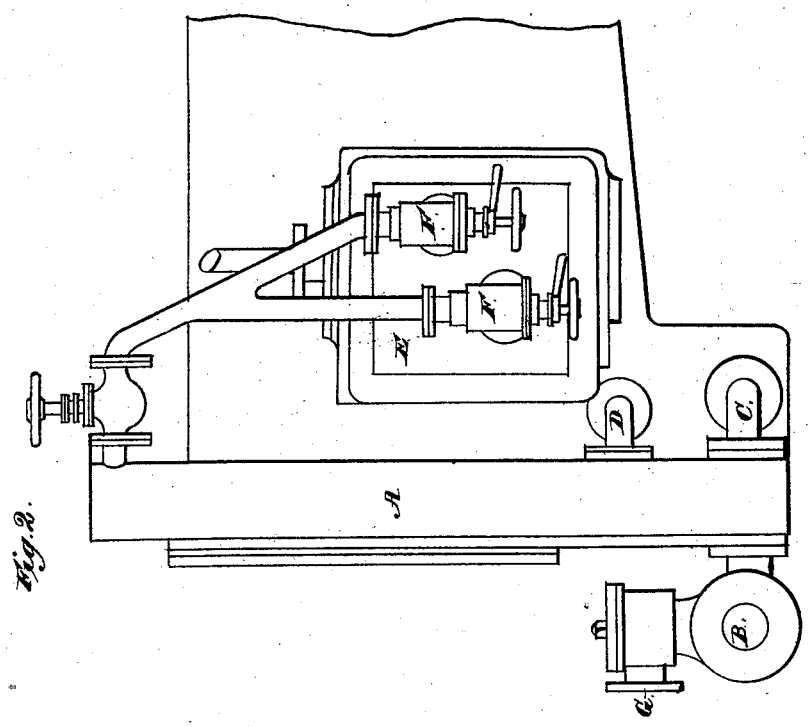
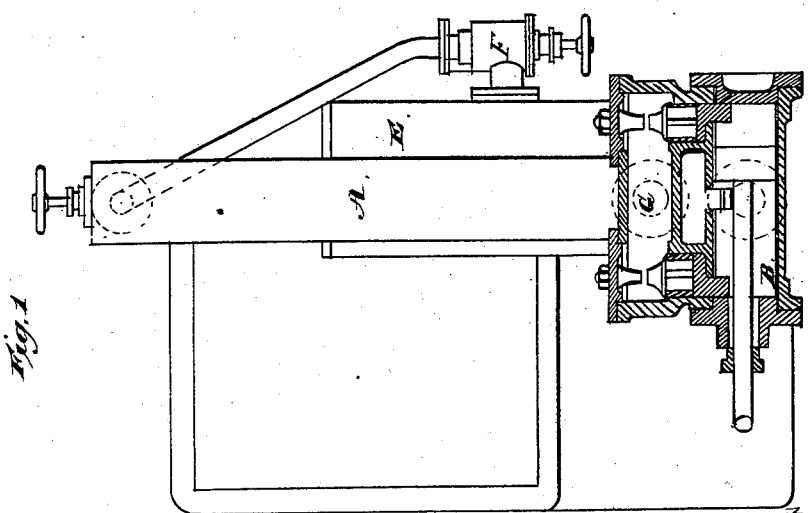
Witnesses:
Charles S. Hyer.
J. A. Rutherford
Inventor.
Alexander W. Robertson.
By James L. Norris.
Atty.

UNITED STATES PATENT OFFICE.

ALEXANDER W. ROBERTSON, OF WESTHAM, COUNTY OF ESSEX, ENGLAND.

SURFACE-CONDENSER.

SPECIFICATION forming part of Letters Patent No. 281,927, dated July 24, 1883.

Application filed January 3, 1883. (No model.)

*To all whom it may concern:*

Be it known that I, ALEXANDER WINTON ROBERTSON, of Westham, in the county of Essex, England, engineer, have invented certain new and useful Improvements in Surface-Condensers, of which the following is a specification, reference being had to the accompanying drawings.

My said invention relates to improvements in the construction of compound and other surface-condensing engines, whereby the necessity for an intermediate pump (such as is commonly termed the "air-pump") between the condenser and the feed-pump is obviated, by which means great advantages are to be obtained, among others being a reduction of the power required to overcome the friction of the engine, a considerable diminution of the risk of an accident from the engines racing in a heavy sea, and also considerable economy in the construction and working expenses.

My said invention consists in the employment of a hot-well or separator-vessel, which rises to a considerable height, and is so connected to the condenser that the water from the latter flows into the said hot-well or separator, and is withdrawn therefrom by the feed-pump. There is also a connection between the condenser and hot-well or separator above the ordinary working water-line, to admit of the withdrawal of air from the condenser and the flow of water when necessity arises. The said hot-well or separator is connected to the circulating-pump, or to any pump or exhauster suitable for the extraction of air only. The air being drawn from the top of the hot-well or separator by every stroke of the pump has the effect of causing any air or uncondensed vapor that may be in the condenser to flow into the hot-well or separator by the connection hereinbefore described. This operation being continued, and the condensed water being also regularly withdrawn by the feed-pump, a vacuum is formed (in accordance with the temperature of the condenser) by the condensation of the steam, and as the vacuum in the hot-well or separator is nearly equal to that in the condenser the flow of the water into the feed-pump takes place with great regularity, the chamber of the said feed-pump being below the lowest part of the condenser.

I will now proceed to refer to the accompanying drawings, from which the nature of my said invention will be more clearly understood.

In said drawings, Figures 1 and 2 represent elevations of the said hot-well or separator and the various pipes and other appliances arranged in connection therewith.

A is the hot-well or separator, which is a hollow vessel, by preference, of a cylindrical form.

B is the feed-pump.

C is the suction-pipe in connection with the lowest part of the condenser, through which the water passes from the condenser and through the bottom of the hot-well to the feed-pump, the air and vapors traveling therewith escaping into the hot-well or separator.

It will be readily understood that the water can be conducted into the lower part of the hot-well or separator by a suitable pipe, and to flow therefrom by a continuation of the same pipe into the feed-pump.

D is the connection between the hot-well or separator and the condenser, arranged above the working level of the water in the condenser.

E is the circulating-pump.

F F are valves on the circulating-pump for regulating the admission of air into the same from the hot-well or separator.

G is the discharge-branch on the feed-pump leading to the boiler.

The water from the condensed steam flows into the pipe C, from which it is withdrawn by the feed-pump B, and is forced by the said pump into the boiler. Any air or uncondensed vapor which may be mixed with the said water is drawn off from the upper part of the hot-well or separator by the circulating-pump through the valves F, which, as will be seen from the accompanying drawings, are inverted.

What I claim is—

1. The combination, with a surface-condenser and feed-pump, of a hot-well or separator, connected at its top with the upper portion or air-space of the condenser, and at its bottom with the lower portion of the condenser, substantially as and for the purposes specified.

2. The combination, with a surface-condenser and feed-pump, of the hot-well or separator A, pipes C and D, circulating-pump E, valves F F, and pipe connecting the hot-well with the circulating-pump, substantially as described.

ALEXANDER WINTON ROBERTSON.

Witnesses:
   GEO. S. VAUGHAN,
      67 *Chancery Lane, London.*
   GEO. J. B. FRANKLIN,
      17 *Gracechurch Street, London.*